US009489620B2

(12) United States Patent
Wang et al.

(10) Patent No.: US 9,489,620 B2
(45) Date of Patent: Nov. 8, 2016

(54) QUICK ANALYSIS OF RESIDUAL STRESS AND DISTORTION IN CAST ALUMINUM COMPONENTS

(71) Applicant: GM Global Technology Operations LLC, Detroit, MI (US)

(72) Inventors: Qigui Wang, Rochester Hills, MI (US); Yucong Wang, West Bloomfield, MI (US); Zhiqiang Gao, Jiangsu (CN); Zhibin Quan, Nanjing (CN)

(73) Assignee: GM Global Technology Operations, LLC, Detroit, MI (US)

( * ) Notice: Subject to any disclaimer, the term of this patent is extended or adjusted under 35 U.S.C. 154(b) by 358 days.

(21) Appl. No.: 14/295,404

(22) Filed: Jun. 4, 2014

(65) Prior Publication Data

US 2015/0356402 A1    Dec. 10, 2015

(51) Int. Cl.
*G06N 3/10* (2006.01)
*G06N 3/08* (2006.01)
*G06F 17/10* (2006.01)
*C22F 1/04* (2006.01)
*G06F 17/50* (2006.01)

(52) U.S. Cl.
CPC . *G06N 3/08* (2013.01); *C22F 1/04* (2013.01); *G06F 17/10* (2013.01); *G06F 17/50* (2013.01); *G06N 3/10* (2013.01)

(58) Field of Classification Search
None
See application file for complete search history.

(56) References Cited

U.S. PATENT DOCUMENTS

| | | | |
|---|---|---|---|
| 5,359,700 A | 10/1994 | Seligson | |
| 5,790,754 A | 8/1998 | Mozer et al. | |
| 6,064,180 A | 5/2000 | Sullivan et al. | |
| 6,070,098 A | 5/2000 | Moore-Ede et al. | |
| 6,857,553 B1 | 2/2005 | Hartman et al. | |
| 7,526,461 B2 | 4/2009 | Srinivasa et al. | |
| 7,810,476 B2 | 10/2010 | Wang et al. | |
| 8,214,182 B2 | 7/2012 | Wang et al. | |
| 2007/0203616 A1 | 8/2007 | Borrmann et al. | |
| 2012/0078436 A1 | 3/2012 | Patel | |

OTHER PUBLICATIONS

Yang, et. al., Optimum design of flow distribution in quenching tank for heat treatment of A357 aluminum alloy large complicated thin-wall workpieces by CFD simulation and ANN approach, Trans. Nonferrous Met. Soc. China vol. 23, 2013, pp. 1442-1451.*
Xiao, et al., "Numerical Simulation and Experimental Validation of Residual Stresses on Water-Quenched Aluminum Alloy Castings", Dec. 2011, Journal of Materials Engineering and Performance, 20(9), pp. 1648-1657.

* cited by examiner

*Primary Examiner* — Wilbert L Starks (57) ABSTRACT

A computer-implemented system and method of rapidly predicting at least one of residual stress and distortion of a quenched aluminum casting. Input data corresponding to at least one of topological features, geometrical features and quenching process parameters associated with the casting is operated upon by the computer that is configured as a neural network to determine output data corresponding to at least one of the residual stress and distortion based on the input data. The neural network is trained to determine the validity of at least one of the input data and output data and to retrain the network when an error threshold is exceeded. Thereby, residual stresses and distortion in the quenched aluminum castings can be predicted using the embodiments in a tiny fraction of the time required by conventional finite-element based approaches.

20 Claims, 4 Drawing Sheets

QUICK ANALYSIS OF RESIDUAL STRESS AND DISTORTION IN CAST ALUMINUM COMPONENTS

BACKGROUND

The present invention relates generally to calculating and predicting residual stresses and distortion in cast aluminum components during a quenching or cooling process, and more particularly to rapidly performing such calculating and predicting such that accurate results are obtained without the use of traditional, time-intensive predictive approaches.

With increasing demand to reduce weight and improve fuel efficiency of automobiles, aluminum castings are being more widely used for critical automotive components, such as engine blocks, cylinder heads and suspension parts. Such aluminum castings are often subjected to cyclic loading such that fatigue performance must be taken into consideration when designing such components. These fatigue properties may be significantly and negatively affected by the presence of residual stresses (i.e., those that remain in a component after manufacturing, processing or the like) in general, and in particular by tensile residual stresses in surface layers, including those around fillets, sharp corners, or the like. Such stresses may originate from a variety of sources. For example, macroscopic residual stresses may arise from heat treatment, machining, secondary thermal and mechanical processing and assembling procedures, whereas microstructural residual stresses often result from thermal expansion or contraction mismatch between phases and constituents, as well as from phase transformations.

Aluminum castings often are subjected to a T6/T7 heat treatment to increase their mechanical properties; such treatment generally includes a solution treatment at a relatively high temperature, followed by a quick quench in a cold or cool media (such as water or forced air), then age hardened at an intermediate temperature. Significant residual stresses and distortion may arise, particularly in those castings having complex geometric structures, due to what is typically a high non-uniformity of temperature distribution in the castings during the quenching processes; this non-uniformity is especially pronounced during rapid quenching. In any event, the presence of residual stresses, distortion or the like in aluminum-based castings can significantly and negatively influence a manufactured component's dimensional tolerance and subsequent performance.

There are often determinable levels of residual stresses in manufactured components, and various ways to measure these stresses in such components. Mechanical techniques such as hole drilling, curvature measurements and crack compliance methods are some of the ways of measuring such stresses, as are diffraction techniques, such as electron, X-ray and neutron, as well as magnetic, ultrasonic, piezospectroscopy, photoelasticity and thermoelastic techniques. Mechanical techniques, however, generally are destructive of the component, while the accuracy of diffraction and other non-destructive techniques in measuring residual stresses generally depends on the extent of microstructure variation and geometric complexity of the component structure. In addition, it is generally impracticable to measure residual stresses in every location of a component not only because of the geometric constraints, but also because of the required time and cost to do so.

Computational simulation is one alternate way to predict residual stresses, where analytical or numerical methods can be used in place of the mechanical or non-destructive approaches mentioned above. Finite element analysis (FEA) is one conventional numerical approach, where the large-scale partial differential equations that explain the mechanics of continuous medium can be modeled as an aggregate of discrete points within the medium. One such system that performs residual stress and distortion predictions with a good accuracy can be found in U.S. Pat. No. 8,214,182 entitled METHODS OF PREDICTING RESIDUAL STRESSES AND DISTORTION IN QUENCHED ALUMINUM CASTINGS that is owned by the Assignee of the present invention and herein incorporated by reference.

Depending on the complexity of the component being modeled, FEA-based simulation needs very long computing times (often measured in hours or even days) to ascertain the residual stresses in cast aluminum components that have been subjected to the aforementioned cooling steps. It would be advantageous if such calculating could be done rapidly—specifically in minutes—in order to expedite early design process iteration turnaround of such components, as well as to shorten and reduce the cost of the development cycle of these components (which may include automotive components such as engine blocks, cylinder heads and other aluminum castings that require heat treatment).

SUMMARY OF THE DISCLOSURE

It is against the above background that embodiments of the present invention generally relate to systems, methods, and articles of manufacture to predict residual stresses and/or distortion of quenched aluminum castings more rapidly than through conventional FEA-based approaches, while maintaining prediction accuracy. As used herein, the term "aluminum castings" and its variants refers generally to any cast component, part or other article of manufacture configured substantially of aluminum or its alloys. The rapid nature of the presently-disclosed aluminum casting analysis approach is achieved through the use of artificial neural networks (ANNs, also referred to herein more simply as neural networks) and more particularly, multilayer feedforward (MFF, also referred to as feedforward) neural network models that use analytical residual stress and distortion data predicted by a sophisticated FEA model together with part (a) geometry information such as curvature and maximum dihedral angle, (b) topological (i.e., topographic) features such as nodal neighbor topologies and (c) quench parameters such as quench temperature and quench media. Significantly, the present invention takes advantage of the fact that neural networks employ training methodologies such that the stress and distortion-predicting computations can be "learned"; once the network is trained, it can produce computational output in negligible time by simple direct arithmetic operations on the input data set, thereby avoiding the significant delays associated with conventional analytic tools.

In accordance with an aspect of the present invention, a computer-implemented method of rapidly predicting at least one of residual stress and distortion of a quenched aluminum casting is disclosed. The method includes receiving computer input data corresponding to at least one of topological features, geometrical features and quenching process parameters associated with the casting, and then operating the computer as a neural network to determine output data corresponding to at least one of residual stress and distortion values. The operating as a neural network corresponds to training the network to determine data validity, as well as to retrain the network when an error threshold is exceeded in the data. As mentioned above, by operating as neural network, fast, accurate results are generated without the delays, costs and complexities associated with traditional finite element-based computations. In fact, the rapidity of the predicting preferably includes outputting one or both of stress or distortion indicia in substantially real-time (for example, measured predominantly in minutes) rather than the hours or days consumed by traditional finite element-based computations. By way of example within the present context, the substantially real-time run time for the rapid analysis of residual stress and distortion for most cast aluminum automotive components using the present invention is less than 10 minutes. By way of a more specific example, such run time for an automotive cylinder head with one million nodes is about 5 minutes. In a preferred form, the method is carried out on a nodal basis such that a mesh of interconnected nodes may be used to simulate the continuous medium defined by the actual cast component, where the calculation times for either stress or distortion vary linearly with the size of surface nodes in the mesh.

In accordance with another aspect of the present invention, a neural network system to provide substantially real-time prediction of at least one of a residual stress and distortion of a quenched aluminum casting is disclosed. The system includes an input configured to receive data relating to at least one of topological features, geometrical features and quenching process parameters associated with the casting, an information output configured to convey data relating to at least one of the residual stress and distortion of the aluminum casting predicted by the system, a processing unit (for example, one or more microprocessors) and a computer-readable medium that has computer-readable program code embodied therein. The computer-readable medium is cooperative with the input, output and processing unit to operate as an ANN to provide the substantially real-time prediction. In a related form, a portion of the system (such as the computer-readable medium) may be configured as an article of manufacture to predict at least one of a residual stress and distortion of an aluminum casting comprises an information input, an information output, and at least one computer usable medium.

BRIEF DESCRIPTION OF THE DRAWINGS

The following detailed description of specific embodiments can be best understood when read in conjunction with the following drawings, where like structure is indicated with like reference numerals and in which.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

Figure 1:
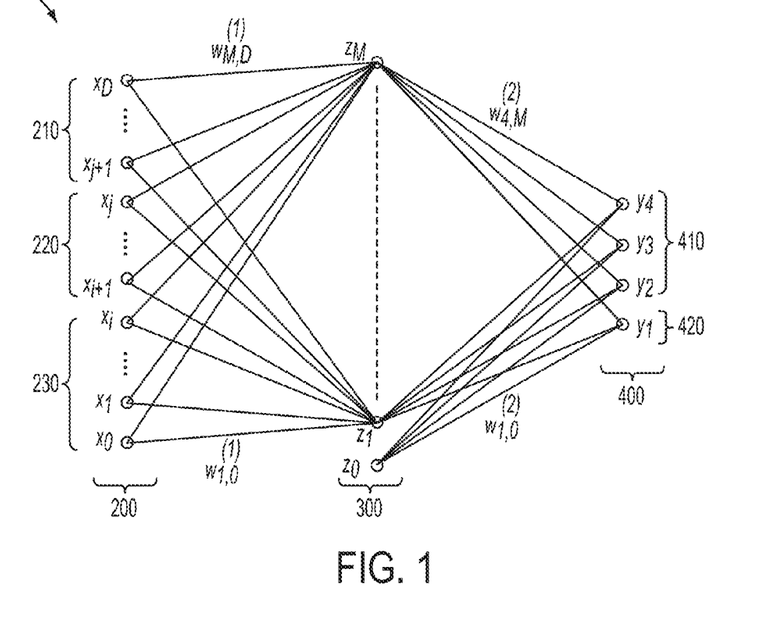
FIG. 1 shows an artificial neural network depicting an aluminum casting residual stress prediction according to one embodiment of the present invention.

Referring first to FIG. 1, a feedforward (i.e., directed acyclic) neural network 100 representation for use in determining at least one of residual stress and distortion of a quenched aluminum-based casting according to an embodiment of the present invention is shown. In neural network 100, an input layer 200 is made up of numerous casting- and quench-specific features, including casting topological features 210, quenching process features 220 and casting geometric features 230. Output layer 400 includes both three-dimensional distortion information 410 and maximum principal stress information 420 of the cast component. At least one hidden layer 300 includes nodes that are connected to the various neurons of the input and output layers 200, 400 through their input and output connection, but that do not accept external inputs or produce external output. Only one hidden layer 300 is shown, although it will be appreciated by those skilled in the art that it may comprise numerous layers, depending on the complexity of the activity being modeled.

In one form, the input nodes (or processing elements) define an input vector made up of parameters $x_o$ through $x_i$ (for geometrical features 230), $x_{i+1}$ through $x_j$ (for quenching process features 220) and $x_{j+1}$ through $x_D$ (for topological features 210); these parameters are operated upon by linear processor elements that can perform simple "and", "or", "not" or related logic gate functions to produce a single predictable output in a manner analogous to human neurons. Mathematically, the subscript "D" represents the total number of input variables. The nodes that correspond to both the hidden and output layers 300 and 400 may similarly operate upon their respective parameters, where the hidden layer 300 has a corresponding matrix size determined by the number of linear processor elements and input parameters of input layer 200 and the number of hidden layer 300 processor elements. Thus (for example), if there were "A" linear processor elements in input layer 200 and "B" processor elements in hidden layer 300, then the matrix dimensions would be A times B. Each one of the signals generated between the input and hidden layers 200, 300 is applied to a corresponding weight $w_{1,0}^{(1)}, \ldots, w_{M,D}^{(1)}$ from a first weighting matrix. Each processor element of the hidden layer 300 (which corresponds to parameters $z_0, z_1, \ldots, z_M$) is made up of a summing node and a nonlinear (for example, sigmoidal) transfer function. Each summing node receives a respective one of the sets of weighted inter-layer signals, as well as a bias signal from a bias vector from which it produces a single output signal. Output layer 400 includes various inter-layer signals as output from the processor elements of the hidden layer 300; each one of these signals is applied to a corresponding weight $w_{1,0}^{(2)}, \ldots, w_{4,M}^{(2)}$ from a second weighting matrix. The processing element of the output layer 400 includes a linear transfer function in a manner generally similar to that of the input layer 200, as well as a bias signal and summing node, the latter to receive each of the weighted inter-layer signals. The signals $y_0, y_1, y_3$ and $y_4$ being output from the output layer 400 processor element make up the neural network's 100 estimation of the residual stress or distortion of the aluminum casting.

Stated succinctly, the information generated at the output nodes $y_0, y_1, y_3$ and $y_4$ is a summation of values provided at the input nodes $x_0, x_1, \ldots, x_D$ that has been mathematically operated upon by the appropriate logic function modified by the corresponding weighting. In equation form:

$$y_k(x,w) = \sigma\left(\sum_{j=0}^{M} w_k^{(2)} h\left(\sum_{i=0}^{D} w_{ji}^{(1)} x_i + w_{j0}^{(1)}\right) + w_{k0}^{(2)}\right) \quad (1)$$

where $y_k(x, w)$ equals the output value (for example, the maximum principle residual stress and distortion) at the k th node for a given input nodal value and corresponding weighting, σ is the mathematic function or mathematic operator, and $x_i$ equals the input value at the i th node. First, M linear combinations of the input variable $x_0, x_1, \ldots, x_D$ are constructed in the form $$a_j = \Sigma_{i=0}^{D} w_{ji}^{(1)} x_i + w_{j0}^{(1)} \quad (2)$$

where j=1, 2, . . . , M, $x_0, x_1, \ldots, x_D$ denotes the element value of a feature vector, and the superscript indicates that the corresponding parameters are in the first layer of the network 100. The parameters $w_{ji}^{(1)}$ are the weights and the parameters $w_{j0}^{(1)}$ are the biases, while the quantity $a_j$ is known as activation; each of these is then transformed by using a differentiable, nonlinear activation function h(·) to give $$z_j = h(a_j). \quad (3)$$

that makes up the hidden units. The nonlinear functions h(·) are generally chosen to be sigmoid functions, such as the logistic sigmoid or the tanh function. These values are again linearly combined to generate output unit activations $$a_k = \Sigma_{j=0}^{M} w_{kj}^{(2)} z_j + w_{k0}^{(2)} \quad (4)$$

where k=1, 2, 3, 4 denotes the four parameters of stress and distortion. This transformation corresponds to the second (i.e., hidden) layer 300 of the network 100. Finally, the output unit activations are transformed using an appropriate activation function to give a set of network outputs $y_k$ that make up the output layer 400. The choice of activation function is determined by the nature of the data. Thus, for standard regression problems, the activation function is the identity so that $y_k = a_k$. These processes can be combined to give the overall network function that, for sigmoid output unit activation functions, takes the form as shown in Eqn. (1) above.

Figure 5:
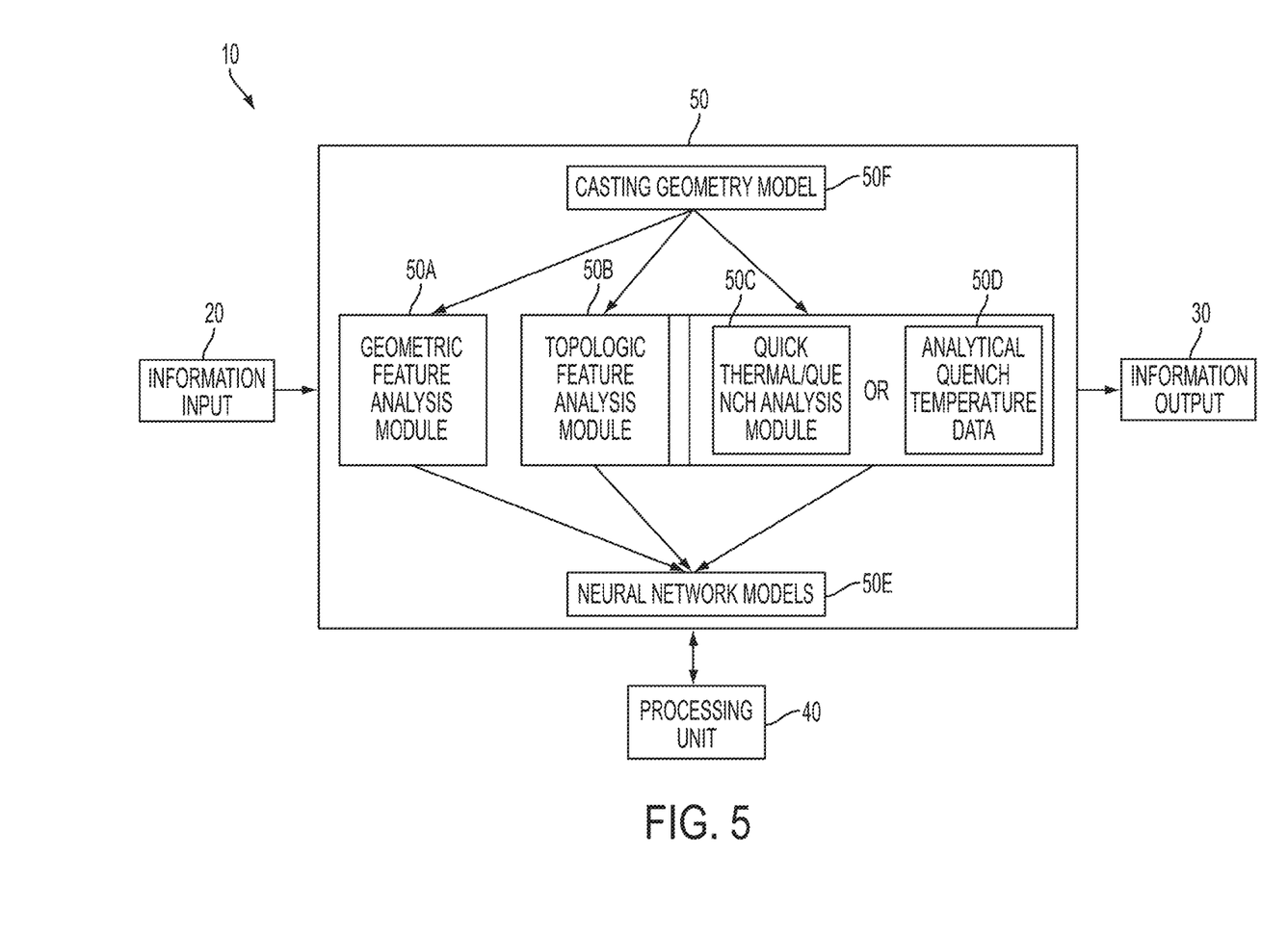
FIG. 5 shows a block diagram of a computer-based system that employs a neural network-based way of making residual stress and distortion predictions according to an aspect of the present invention.

Referring next to FIG. 5 in conjunction with FIG. 1, a computer-based system 10 may be used to predict a residual stress and distortion of an aluminum casting. The system 10 includes an information input 20, an information output 30, a processing unit 40 and a computer-readable medium 50. The information input 20 is configured to receive the information relating to the aluminum casting, while the information output 30 is configured to convey information relating to the residual stress and distortion of the aluminum casting predicted by the system 10. The computer-readable medium 50 includes computer readable program code embodied therein, such code may include one or more of a geometric feature analysis module 50A, a topologic feature analysis module 50B and a quick thermal/quench analysis module 50C, as well as an analytical quench temperature data set 50D (when available) that can be directly inputted; in one form, such a data set is generated using the analytical model of U.S. Pat. No. 8,214,182 discussed above. A neural network program 50E is also included on computer-readable medium 50. The neural network program 50E may be any suitable type of neural network, such as those commercially available from numerous vendors.

In a preferred form, the computer-readable medium 50 is in the form of memory with computer-readable program code means to process at least a portion of the received information relating to the aluminum casting. As will be appreciated by those skilled in the art, the computer memory may be in the form of random-access memory (RAM, also called mass memory, which can be used for the temporary storage of data) and instruction-storing memory in the form of read-only memory (ROM). Information input 20 may accept information in a variety of ways, including sensors, internet or related connection to an outside source of data, optical disks, USB port, flash drives or the like. In one preferred example, the casting geometry model to be analyzed for residual stress and distortion is inputted as a graphic file. As will be appreciated by those skilled in the art, computer system 10 may exist as an autonomous (i.e., stand-alone) unit, or may be the part of a larger network, such as those encountered in cloud computing, where various computation, software, data access and storage services may reside in disparate physical locations. Such a dissociation of the computational resources does not detract from such a system being categorized as a computer.

In a particular form, the computer-readable program code means correspond to one or more modules including those mentioned above: the geometric feature analysis module 50A, the topologic feature analysis module 50B and the quick thermal/quench analysis module 50C, all of which can be loaded into ROM or RAM, as well as the analytical quench temperature data set 50D (when available) that can be directly inputted; in one form, such a data set is generated using the analytical model of U.S. Pat. No. 8,214,182 discussed above. When available, the analytical quench temperature data set 50D provides an alternative to the quick thermal/quench analysis module 50C; significantly, the direct entry of the analytical quench temperature data set 50D into the code, program, algorithm or related means embedded on computer-readable medium 50 does not decrease the speed with which the present invention operates. Such computer-readable program code means may also be formed as part of an article of manufacture such that the instructions contained in the code are situated on a magnetically-readable or optically-readable disk or other related non-transitory, machine-readable medium, such as a flash memory device, CD-ROM, DVD-ROM, EEPROM, floppy disk capable of storing machine-executable instructions and data structures. Such a medium is capable of being accessed by the computer system 10 or other electronic device having one or more of the processing units 40. The neural network model 50E and the casting geometry model 50F of the computer-readable medium 50 interact with each other through the modules 50A through 50D to quickly calculate the residual stress and distortion, where (as mentioned above), thermal quench information may be provided by either the thermal/quench analysis module 50C or the analytical quench temperature data set 50D.

Neural network 100 can be thought of as emulating the human brain through the massively parallel interconnection of simple neuron-like elements distributed into the discrete layers mentioned above. Such distributed computational capability offers flexibility that cannot be found in the centralized processing approaches of conventional von Neumann-based architectures (although the latter can be programmed to operate as the former via one or more appropriately-configured software modules as understood by those skilled in the art). In effect, neural network decision-making mimics human intuition and conclusion-drawing even when presented with input that is complex, partial and sometimes irrelevant. It achieves this through a learning process as a way to mimic intelligent thought by the approximation of an arbitrary function from the observed or sensed data. As mentioned above, this learning can be achieved by using training patterns to identify how much weight or relevance to attribute to unknown information; frequently, this information is hidden in the data such that by adjusting the weighting in response to a particular training pattern, the neural network can automatically learn an underlying set of rules that best correlate the input and output data.

As mentioned elsewhere in this disclosure, the computations may be embodied on the computer-readable medium 50 where computer-readable program code can be embodied. The computer-readable medium 50 is cooperative with the processing unit 40, the information input 20, and the information output 30 such that the received information is operated upon by the processing unit 40 and computer-readable program code to be presented to the information output 30 as a prediction of at least one of the residual stress and distortion of the aluminum casting. In one form, the computer readable program code is made up of modules 50A through 50E above. In particular, the geometric feature analysis module 50A takes the casting geometry model to figure out the key geometric features 230 such as coordinate, curvature, the largest dihedral angle and provides the information to neural network model 50E to calculate the residual stress and distortion. Similarly, the topologic feature analysis module 50B takes the casting geometry model 50F to find out the key topologic features 210 such as neighbor's nodes connection for neural network model 50E calculation of residual stress and distortion. The quick thermal/quench analysis module 50C takes the casting geometry model to conduct a quick quenching (cooling) analysis and provides the nodal-based temperature dataset 220 (as a function of time) to neural network models 50E for residual stress and distortion analysis. As an alternative solution of 50C, the analytical quench temperature dataset can be directly mapped to the casting geometry model and sent to neural network models 50E for residual stress and distortion calculations. Neural network models 50E needs information from all three modules 50A, 50B and 50C/50D to be able to calculate the residual stress and distortion.

In one particular form, a well-known technique referred to as backpropagation helps to establish a suitable learning algorithm. By knowing the desired output, and adjusting accordingly the weighting of the input, the supervised training of the MFF can rapidly infer the mapping implied by the data sets. Referring with particularity to the figure, the neurons (shown as nodal processing elements at each of the connection points $z_0, z_1, \ldots, z_m$ in the hidden layer 300)—in addition to being weighted—receive multiple inputs from other neurons (with the exception of the neurons in the input layer 200) to generate a limited number of outputs in output layer 400 in accordance with a suitable (typically nonlinear) activation function. This backpropagation is part of the network's multistep supervised learning process that includes (a) definition of the input and data sets (which are often thought of as being organized as vectors), (b) training and data modeling testing, (c) error determination and reduction and (d) result processing.

The weighting may be implemented via (software-based) rules to determine how to change the weighting may change in response to the inputs and desired outputs that arise during the network's training period. The multilayer nature of a network is important for computing continuous (rather than discrete or step) output. As such, a logistic function (also called an activation function or firing function, a common example of which is the sigmoid function) may be employed to better correlate the output signal to a continuous (rather than step) function as way to enhance output accuracy through incorporation into the backpropagation part of the computation. In fact, along with the linear logic functions discussed above at each of the nodal processing elements of the input layer 200 and output layer 400, the nonlinearities introduced by the presence of the sigmoid-based activation function in the hidden layer (or layers) 300 is critical to the operation of neural network 100 in providing accurate residual stress and deformation estimations in the output layer 400 where there may be a non-linear correspondence between the input topological, quenching process and geometrical features and the output stresses and distortions. This is especially true given the complex geometries and cooling properties of particular cast components, such as engine blocks, cylinder heads, suspension parts or the like. As such, the present invention allows for accurate estimations of the impact on stresses and deformations in such components produced by these properties, even when the relationship between them is not linear (or even clear). Accordingly, the combination of the non-linear processing that takes place within the hidden layer 300 and the linear processing that takes place at the output layer 400 can accurately model the stress and distortion behavior of a cast aluminum component in near-real time.

Figure 2:
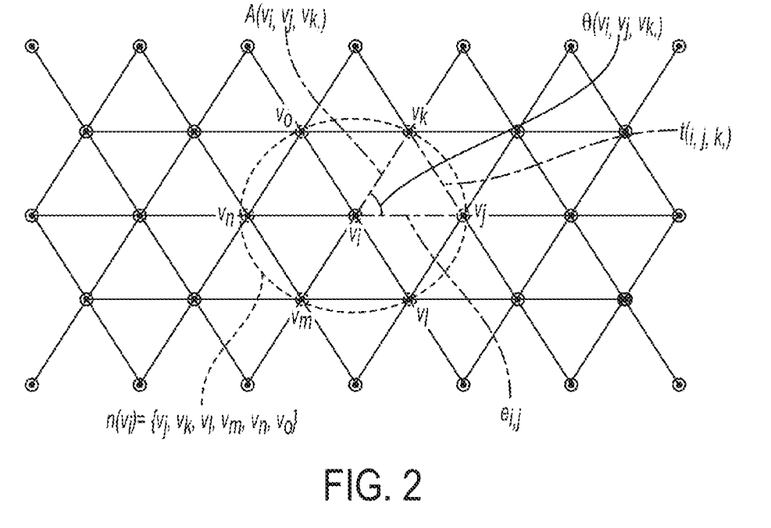
FIG. 2 shows a schematic representation of some geometric and topological features that are part of the inputs of the neural network of FIG. 1.
Figure 3A:
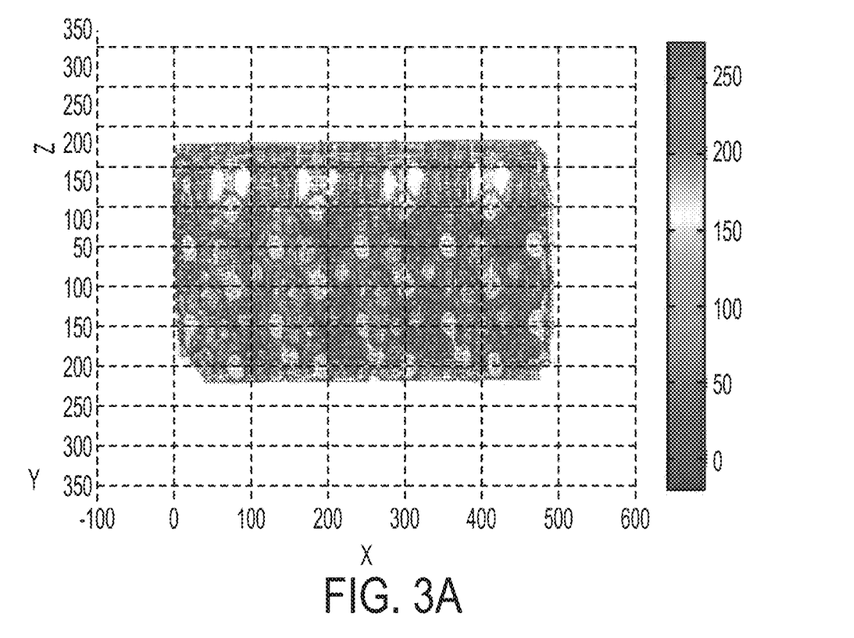
FIGS. 3A and 3B show a comparison of residual stress predictions using both FEA and neural network approaches.
Figure 3B:
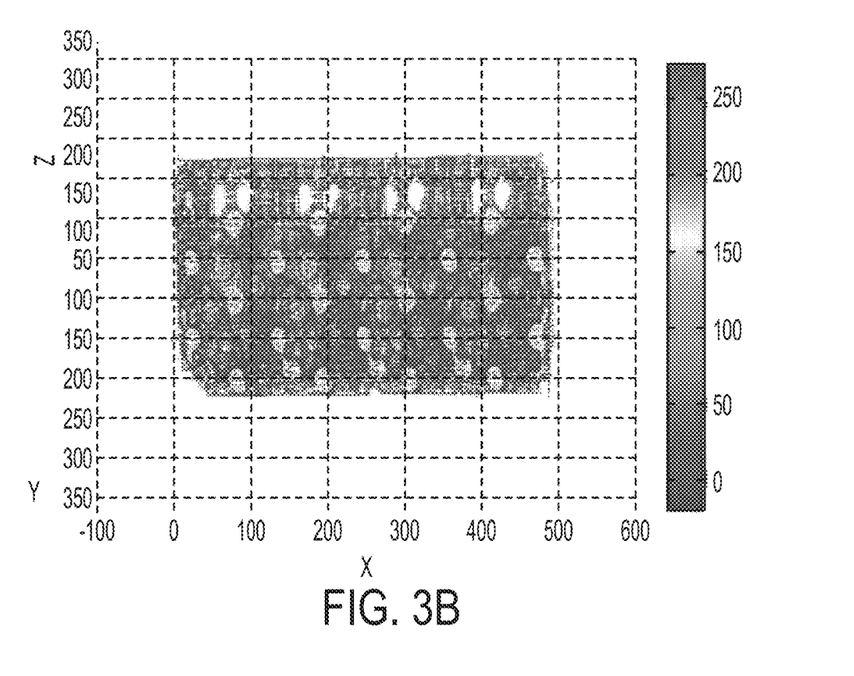
Figure 4A:
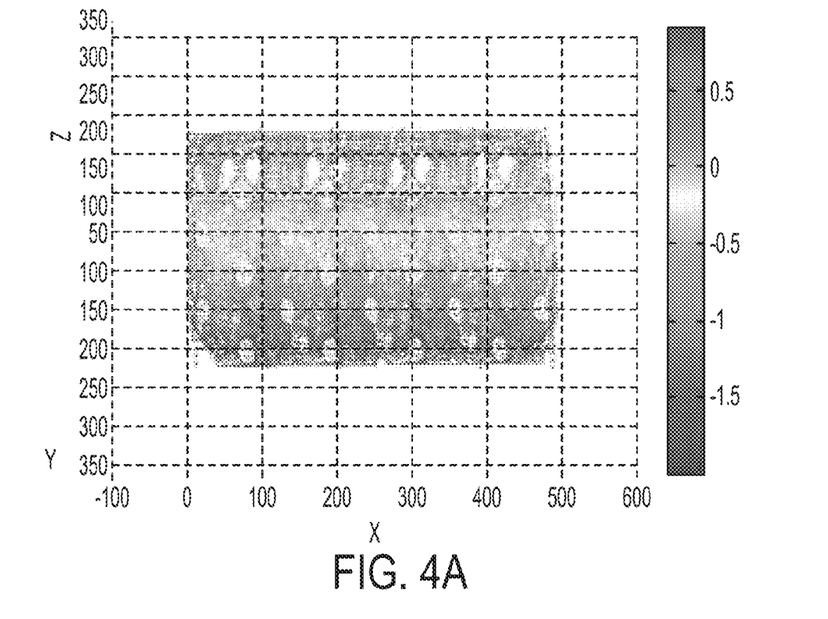
FIGS. 4A and 4B show a comparison of distortion predictions using both FEA and neural network approaches.
Figure 4B:
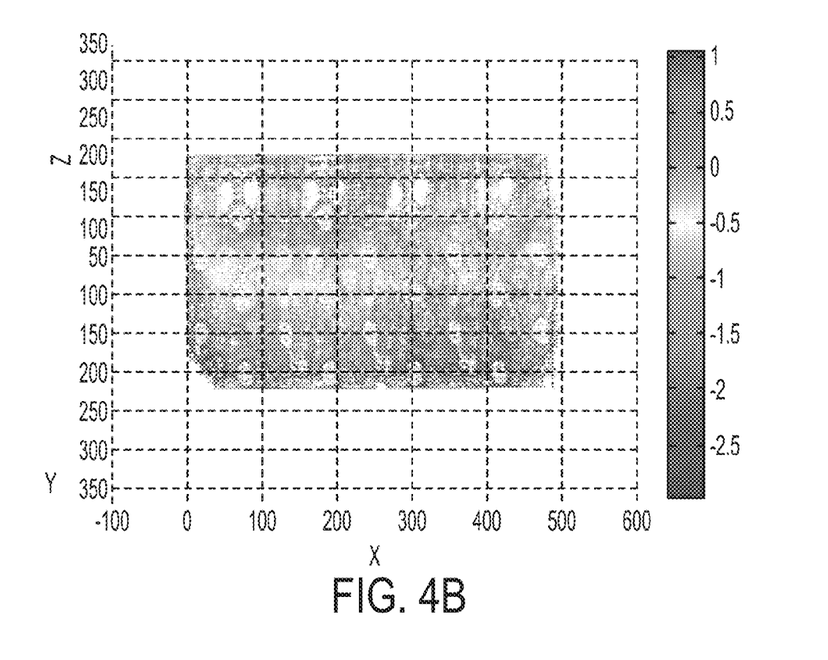

Referring next to FIG. 2, a schematic illustration of the geometric and topological features is shown for a small local region in graphic mesh of the surface of a notional cast aluminum component. The neural network 100 is trained to learn time-based patterns contained within the input and output data, as well as to make predictions based on those patterns. In a manner generally analogous to the creation of a finite element mesh, the product surfaces are made up of a number of triangles, where $v_i$ is the node of interest, and $n(v_i)=\{v_j, v_k, v_l, v_m, v_n, v_o\}$ is the set of neighbor nodes of $v_i$. As mentioned above, residual stress and distortion data can use geometry information (i.e., curvature, maximum dihedral angle or the like), topological information and quench process information (such as quench temperature and quench media) to provide the rapid (i.e., real time or near-real time) assessment of the impact of certain casting process steps on a particular cast aluminum component. Regarding the geometry information, the curvature k at node $v_i$ may be represented by the Gaussian curvatuve formula:

$$k(v_i) = \frac{3 \times \left\{2\pi - \sum_{v_j, v_k \in n(v_i) \wedge e_{ij}=e_{jk}=e_{ki}=1} \theta(v_i, v_j, v_k)\right\}}{\sum_{v_j, v_k \in n(v_i) \wedge e_{ij}=e_{jk}=e_{ki}=1} A(v_i, v_j, v_k)} \quad (5)$$

where $k(v_i)$ equals the Gaussian curvature based on principal curvatures as a way to determine elliptic, hyperbolic and parabolic points on the surface of the part being analyzed. In the equation, $\theta(v_i, v_j, v_k)$ denotes the angle for the triangle $t_{i,j,k}$ at node $v_i$, and $A(v_i, v_j, v_k)$ denotes the area of the triangle $t_{i,j,k}$ that is depicted in the figure. Likewise, $\Sigma$ is the traditional mathematical summation operator. Likewise, the maximum dihedral angle can be represented by the following formulae:

$$\theta(v_i) = \max_{v_j \in n(v_i)} \{\theta(e_{i,j})\} \quad (6)$$

$$\theta(e_{i,j}) = \arccos \frac{n(t_{i,j,k}) \cdot n(t_{i,j,l})}{|n(t_{i,j,k})| \times |n(t_{i,j,l})|} \quad (7)$$

where as shown in the figure, $\theta(e_{i,j})$ denotes the dihedral angle of edge $e_{i,j}$, as node $v_i$ has a set of neighbor nodes and thus a set of dihedral angles the maximum value of which is calculated using equation (5). Equation (6) is used to calculate individual dihedral angle for each neighbor node (i.e. each triangle of the figure). The present inventors have discovered that maximum dihedral angle is one of the important geometric features to be included as one of the input variables for developing the present neural network models.

Regarding the topographic information, to search for the first k neighbors of a particular node $v_i$, a breadth-first-search (BFS) method was developed with the following function $$N(v_i)=n(\ldots n(n(v_i))) \quad (8)$$

as a way to visit, expand and inspect nodes adjacent node $v_i$. In other words, the BFS is a searching method to find the closest numbers of neighbors of node $v_i$ and is particularly useful when the search is limited to inspection of a node on a graph, as well as those of nodes that neighbor the presently-visited node. By progressively branching out to unvisited neighbor nodes, additional input variable information may be identified and operated upon as part of a thorough neural network model.

Regarding the key quench process variables, the nodal-based casting temperature may be predicted as a function of time:

$$T_i=f(t_i), i=1,2,\ldots,n \quad (9)$$

where T is the temperature, and $t_i$ is the time (measured in appropriate units, such as seconds or minutes). The present inventors have also found node temperature change during quench is another important input variable to be included in the neural network model.

Referring next to FIGS. 3A, 3B, 4A and 4B, the results of a FEA-based residual stress (FIG. 3A) and distortion (FIG. 4A) analysis is shown as contour plots for a section of a representative cast aluminum part, while the results of an ANN-based residual stress (FIG. 3B) and distortion (FIG. 4B) analysis according to an aspect of the present invention is shown for the same section. Significantly, the substantial agreement between FIGS. 3A and 3B for the stress and between FIGS. 4A and 4B for the distortion show that the time-intensive calculations generated by the FEA-based approach may be replicated in far less time by using a neural network-based approach. In general, the FEA-based stress and distortion analysis approach of FIGS. 3A and 4A require about 48 hours of run time; by contrast, the stress and distortion analysis approach of FIGS. 3B and 4B using the neural network-based approach of the present invention takes about 5 minutes of run time. Taking sample information from these contour plots, Table 1 shows that the average absolute testing error (AAE) is 14.958 MPa, while the average relative testing error (ARE) is 0.1401, the absolute testing error for tensile stress (MaxAE) is 38.9654 MPa, the relative testing error for tensile stress (MaxRE) is 0.1627, the absolute testing error for compressive stress (MinAE) is 6.9006 MPa and the relative testing error for compressive stress (MinRE) is 0.0913. As all of these testing errors are close to the training errors, the ANN model is not overfitting.

TABLE 1

| Testing or | Evaluation Criteria | | | | | |
|---|---|---|---|---|---|---|
| Training Error | AAE | ARE | MaxAE | MaxRE | MinAE | MinRE |
| Testing Error | 14.9587 | 0.1401 | 38.9654 | 0.1627 | 6.9006 | 0.0913 |
| Training Error | 14.9294 | 0.1398 | 33.4936 | 0.1437 | 4.7709 | 0.0796 |

Likewise, as shown in Table 2, all AAEs for distortion in a three-dimensional Cartesian coordinate system are less than 0.01 mm, and all AREs for distortion in three directions are less than 0.01 mm. As above, the testing errors are very close to the training error, so the ANN model is deemed to be suitably accurate.

TABLE 2

| Distortion Direction | Testing or Training Error | Evaluation Criteria | |
|---|---|---|---|
| | | AAE | ARE |
| X Direction | Testing Error | 0.0095 | 0.006 |
| | Training Error | 0.0095 | 0.006 |
| Y Direction | Testing Error | 0.0078 | 0.0051 |
| | Training Error | 0.0078 | 0.0051 |
| Z Direction | Testing Error | 0.0068 | 0.0073 |
| | Training Error | 0.0068 | 0.0073 |

In quenching and related heat treatment operations for aluminum castings, the induced residual stresses and distortion generally are due to differences in cooling rates; these in turn are highly dependent upon the particular location within the casting's geometric structure. Material constitutive models (which may be coupled in an FEA analysis such as Abaqus FEA or the like via particular material subroutines (such as UMAT within Abaqus) provide user-defined mechanical behavior of a particular material as a way to further enhance prediction accuracy. Significantly, such material subroutines are called in an FEA-based approach at all material calculation nodal points for which the material definition includes such time-dependent material behavior. Moreover, such a subroutine can be used to update stresses and solution-dependent state variables to their values at the end of the particular time increment for which the subroutine is called as a way to provide a material matrix (for example, a Jacobian matrix) for the constitutive model. By way of example, Table 3 below highlights a sampling of material properties of two widely-used aluminum alloy castings 319 and A356, along with some of the quantifiable properties that are typically used as part of the material constitutive modeling.

TABLE 3

| Alloy | T (C.) | Density (g/(cm) 3) | Average expansion coeff. (10e−6 1/K) | Thermal conductivity (W/(m * K)) | Young's modulus (GPa) | Shear modulus (GPa) | Poisson's ratio | Specific heat (J/(gK)) |
|---|---|---|---|---|---|---|---|---|
| 319 | 550 | 2.62782 | 32.36493 | 128.17553 | 18.49579 | 6.66119 | 0.38832 | 7.0722 |
| | 500 | 2.66402 | 25.81007 | 153.03718 | 56.30864 | 20.90502 | 0.34677 | 1.0802 |
| | 450 | 2.67568 | 25.30192 | 151.261 | 58.40357 | 21.73539 | 0.34351 | 1.0566 |
| | 400 | 2.68704 | 24.79681 | 149.4268 | 60.49212 | 22.56444 | 0.34043 | 1.035 |
| | 350 | 2.69809 | 24.29472 | 147.50036 | 62.57232 | 23.3911 | 0.33752 | 1.0148 |
| | 300 | 2.70882 | 23.79566 | 145.44036 | 64.64311 | 24.21462 | 0.3348 | 0.9948 |
| | 250 | 2.71923 | 23.29963 | 143.1957 | 66.70471 | 25.03474 | 0.33224 | 0.9748 |

TABLE 3-continued

| Alloy | T (C.) | Density (g/(cm)3) | Average expansion coeff. (10e−6 1/K) | Thermal conductivity (W/(m * K)) | Young's modulus (GPa) | Shear modulus (GPa) | Poisson's ratio | Specific heat (J/(gK)) |
|---|---|---|---|---|---|---|---|---|
| | 200 | 2.72932 | 22.80662 | 140.7011 | 68.75737 | 25.85122 | 0.32987 | 0.9548 |
| | 150 | 2.73938 | 22.31665 | 137.86874 | 70.80134 | 26.66381 | 0.32767 | 0.9336 |
| | 100 | 2.7485 | 21.82971 | 134.57266 | 72.83693 | 27.47228 | 0.32564 | 0.9106 |
| | 50 | 2.75758 | 21.3458 | 130.61714 | 74.86455 | 28.27645 | 0.3238 | 0.884 |
| | 25 | 2.762 | 21.15311 | 128.29638 | 75.87554 | 28.67688 | 0.32294 | 0.8716 |
| A356 | 550 | 2.57496 | 26.77592 | 169.81029 | 46.44404 | 17.04294 | 0.36256 | 3.9606 |
| | 500 | 2.58711 | 25.90735 | 171.67991 | 52.86888 | 19.49988 | 0.35562 | 1.1084 |
| | 450 | 2.59849 | 25.39366 | 169.93562 | 54.84217 | 20.27902 | 0.35219 | 1.081 |
| | 400 | 2.60957 | 24.88301 | 168.19032 | 56.8093 | 21.05691 | 0.34895 | 1.0588 |
| | 350 | 2.62034 | 24.3754 | 166.4176 | 58.77156 | 21.83373 | 0.34589 | 1.038 |
| | 300 | 2.63081 | 23.87084 | 164.58263 | 60.72826 | 22.60888 | 0.34302 | 1.0174 |
| | 250 | 2.64096 | 23.36932 | 162.63878 | 62.67958 | 23.38209 | 0.34033 | 0.9968 |
| | 200 | 2.65079 | 22.87085 | 160.52211 | 64.62569 | 24.1531 | 0.33783 | 0.9762 |
| | 150 | 2.6603 | 22.37542 | 158.14154 | 66.56677 | 24.92165 | 0.33552 | 0.9544 |
| | 100 | 2.66948 | 21.88303 | 155.36033 | 68.50303 | 25.68748 | 0.33339 | 0.9308 |
| | 25 | 2.68262 | 21.19882 | 149.91632 | 71.39893 | 26.8306 | 0.33055 | 0.891 |

By contrast, in the neural network models of the present invention, material constitutive relationships such as these are not directly used (thereby resulting in significant computational savings). Instead, the material property effect has been captured in the quenching temperature changes and the stress and distortion data that are used in training the models of the neural network 100. In other words, data such as that depicted in the table are used as precursors to train the neural network 100 models. In the present invention, the material thermal properties as shown in the above table for 319 and A356 alloys—as well as materials constitutive models (for mechanical properties)—have been reflected in the analytical temperature variation during quench. Likewise, the residual stress and distortion data (such as that calculated using the FEA-based approach discussed above) can be used to train the neural network 100 models. After such training, the neural network 100 models can predict material residual stress and distortion without using materials constitutive models and thermophysical properties again, thereby avoiding some of the computationally-intensive operations that are repeated each time an FEA-based approach is performed.

It is noted that while the majority of the description provided herein is specific to an embodiment of the present invention relating to a system to predict at least one of a residual stress and distortion of a quenched aluminum casting, the same description applies equally consistently to other embodiments of the present invention relating to methods and articles of manufacture to predict at least one of a residual stress and distortion of a quenched aluminum casting.

It is further noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is additionally noted that terms like "generally", "commonly", and "typically"—when utilized herein—are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein, it is also noted that the terms "substantially", "significantly" and "approximately" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A computer-implemented method of rapidly predicting at least one of residual stress and distortion of a quenched aluminum casting, said method comprising:
    receiving into said computer input data corresponding to at least one of topological features, geometrical features and quenching process parameters associated with said casting; and
    operating said computer as a neural network to determine output data corresponding to at least one of said residual stress and distortion based on said input data, said operating configured to train said network to determine the validity of at least one of said input data and output data and to retrain said network when an error threshold is exceeded.

2. The method of claim 1, wherein said input data corresponding to at least one of topological features, geometrical features and quenching process parameters associated with said casting comprises input data corresponding to each of said topological features, geometrical features and quenching process parameters.

3. The method of claim 2, wherein said geometrical features include at least the Gaussian curvature that is determined by the formula:

$$k(v_i) = \frac{3 \times \left\{2\pi - \sum_{v_j, v_k \in n(v_i) \wedge e_{ij} = e_{jk} = e_{ki} = 1} \theta(v_i, v_j, v_k)\right\}}{\sum_{v_j, v_k \in n(v_i) \wedge e_{ij} = e_{jk} = e_{ki} = 1} A(v_i, v_j, v_k)}.$$

4. The method of claim 3, wherein said geometrical features comprise at least a maximum dihedral angle that is calculated using the formula:

$$\theta(v_i) = \max_{v_j \in n(v_i)} \{\theta(e_{i,j})\}.$$

5. The method of claim 2, wherein said quenching process parameters comprises node temperature changes that take place during a quench of said casting.

6. The method of claim 2, wherein said topological features include at least a set of nearest neighbor nodes that are determined by a breadth-first-search using the following function:

$$N(v_i) = n(\ldots n(n(v_i))).$$

7. The method of claim 2, wherein said input data is received in nodal form based on a mesh simulation of said casting.

8. The method of claim 1, wherein said network is defined by at least one input layer, at least one hidden layer and at least one output layer such that training of said network is achieved by weighting values calculated by at least one of said hidden layer and said output layer within said network.

9. The method of claim 8, wherein weighting values may be changed by said network during said operating.

10. The method of claim 9, wherein at least one of said input layer and said output layer performs a linear processing step on respective data received therein.

11. The method of claim 8, wherein said hidden layer performs a nonlinear processing step on data received therein.

12. The method of claim 1, wherein said rapidly predicting comprises outputting indicia of at least one of residual stress and distortion of said casting in substantially real-time.

13. The method of claim 12, wherein said substantially real-time is no more than about ten minutes.

14. A neural network system to provide substantially real-time prediction of at least one of a residual stress and distortion of a quenched aluminum casting, the system comprising:

an input configured to receive data relating to topological features, geometrical features and quenching process parameters associated with said casting;

an information output configured to convey data relating to at least one of the residual stress and distortion of said casting predicted by the system;

a processing unit; and a computer-readable medium comprising a computer-readable program code embodied therein, said computer-readable medium cooperative with said input, output and processing unit to operate as an artificial neural network to provide said substantially real-time prediction.

15. The system of claim 14, wherein said program code is configured to operate over at least one input layer, at least one hidden layer and at least one output layer in said network such that training of said network is achieved by weighting values calculated by at least one of said hidden layer and said output layer within said network.

16. The system of claim 14, wherein said geometrical features include at least the Gaussian curvature that is determined by the formula:

$$k(v_i) = \frac{3 \times \left\{2\pi - \sum_{v_j, v_k \in n(v_i) \wedge e_{ij} = e_{jk} = e_{ki} = 1} \theta(v_i, v_j, v_k)\right\}}{\sum_{v_j, v_k \in n(v_i) \wedge e_{ij} = e_{jk} = e_{ki} = 1} A(v_i, v_j, v_k)}.$$

17. The system of claim 16, wherein said geometrical features comprise at least a maximum dihedral angle that is calculated using the formula:

$$\theta(v_i) = \max_{v_j \in n(v_i)} \{\theta(e_{i,j})\}.$$

18. The system of claim 14, wherein said quenching process parameters comprises node temperature changes that take place during a quench of said casting.

19. The system of claim 14, wherein said topological features include at least a set of nearest neighbor nodes that are determined by a breadth-first-search using the function $$N(v_i) = n(\ldots n(n(v_i))).$$

20. The system of claim 14, wherein said input data is received in nodal form based on a mesh simulation of said casting.

* * * * *